3,301,873
ORGANOPHOSPHORUS COMPOUNDS

Pieter Ten Haken, Herne Bay, Kent, England, assignor to Shell Oil Company, New York, N.Y., a corporation of Delaware
No Drawing. Filed Mar. 19, 1965, Ser. No. 441,328
Claims priority, application Great Britain, Apr. 3, 1964, 13,851/64
7 Claims. (Cl. 260—332.1)

This invention relates to novel organophosphorus compounds, to insecticidal compositions containing them, and to the use of said compounds and compositions in combatting insect pests, and in protecting ornamental and crop plants from attack by insects.

The novel compounds of the invention can be represented by the general formula:

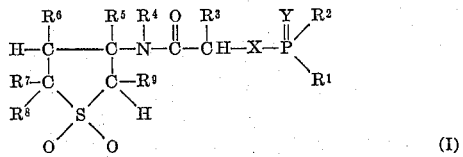

wherein each of $R^1$ and $R^2$ is alkyl or alkoxy of from 1 to 4 carbon atoms, $R^3$ is hydrogen or alkyl of from 1 to 4 carbon atoms, $R^4$ is hydrogen, alkyl, or alkenyl of up to 4 carbon atoms, or cycloalkyl or aralkyl of up to 10 carbon atoms, each of $R^5$, $R^6$, $R^7$, $R^8$ and $R^9$ is hydrogen or alkyl of from 1 to 4 carbon atoms, and X and Y each is oxygen or sulfur.

Where one of the foregoing symbols represents alkyl, alkoxy or alkenyl, the group can be of either straight-chain or branched-chain configuration. In the alkenyl groups, the unsaturation preferably does not involve the carbon atom bonded to the nitrogen atom. Suitable alkyl and alkoxy groups thus are those in which the alkyl moiety is methyl, ethyl, n- or isopropyl, n-, sec-, iso-, or tert-butyl. Suitable alkenyl groups include allyl and methallyl. Because of their high level of insecticidal activity, the compounds in which $R^1$ and $R^2$ each represents methoxy or ethoxy are to be preferred. Preferred cycloalkyl groups are those in which the ring contains from 5 to 7 carbon atoms, with cyclohexyl being most preferred. Suitable cycloalkyl groups include the cyclopentyl, cyclohexyl and cycloheptyl groups, the various methyl-, dimethyl-, ethyl-, diethyl-, methyl,ethyl-substituted and like alkyl-substituted cyclopentyl, cyclohexyl and cycloheptyl groups. Preferred aralkyl groups are those in which the aryl portion is mononuclear and the alkylene moiety bonding the aryl moiety to the indicated nitrogen atom contains from 1 to 2—preferably 1—carbon atoms. Suitable aralkyl groups include the benzyl, alpha-methylbenzyl, 2-phenethyl, p-methylbenzyl, and the like aralkyl groups.

It is to be preferred that all of the substituents be hydrocarbon in character.

Because of the insecticidal activity, a particularly preferred genus of the general class of compounds described above is that genus wherein $R^1$ and $R^2$ each is methoxy or ethoxy, $R^4$ is methyl, and $R^3$, $R^5$, $R^6$, $R^7$, $R^8$ and $R^9$ all are hydrogen.

A number of typical species of the compounds of the invention are set forth in Examples I through XIX, following.

The compounds of the invention can be prepared by the following process. In the description of the process, for simplicity only the operative portions of the molecules—those portions involved in the reactions—and sufficient of the other structure to clearly identify the reactant, is set forth.

(a) A sulfolanyl amine (hereinafter designated as Compound II), or an acid halide salt thereof, is reacted with an acid halide or acid anhydride of an acid (hereinafter designated as Compound III), to form Compound IV as follows:

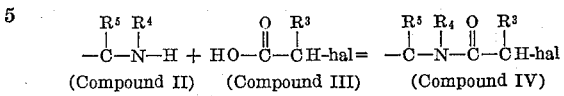

(Compound II)   (Compound III)   (Compound IV)

wherein hal is middle halogen (bromine, or chlorine), preferably chlorine;

(b) Compound IV is reacted with either a monohydric acid of pentavalent phosphorus (compound V)

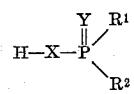

in the presence of a base, or with a salt thereof (compound VI)

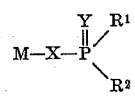

wherein M is alkali or alkaline earth metal or ammonium, to form the desired product.

Compound II can be prepared by the addition of the appropriate amine to the appropriate 2,5-dihydrothiophene-1,1-dioxide in a conventional manner. A suitable method has, for instance, been described in J. Am. Chem. Soc. 71, 370–371 (1949).

Compound IV is preferably prepared by heating a hydrogen halide salt of compound II with a molar excess of an acid halide of the acid compound III, at a temperature between 50 and 150° C., preferably between 80 and 120° C. The molar excess of acid halide, which may be, for example, 10–400% or even more, serves the purpose of solvent. After the reaction, compound IV may be obtained by distilling off the excess of acid halide, washing the residue with water, and drying it. If desired, the product may be further purified by recrystallization from a suitable solvent, for example, benzene.

When compound IV is prepared by reacting compound II with an acid halide or acid anhydride of the acid (compound III) this reaction is preferably carried out in the presence of a base such as, for example, triethylamine or one of the other bases mentioned below. The reaction is preferably carried out in a suitable inert solvent, for example methylene chloride, preferably at a temperature between −20° and 40° C. The product may be isolated from the reaction mixture in any conventional manner.

The reaction of compound IV with compound V or VI mentioned under (b) is preferably carried out in the presence of an inert solvent. Preferred solvents are ketones such as methyl ethyl ketone, methyl isobutyl ketone, cyclohexanone, and especially acetone. Other suitable solvents are, for example, ethanol, isopropanol, ethyl acetate acetonitrile, dioxane, benzene, toluene, xylene, chloroform, carbon tetrachloride, and 1,2-dimethoxyethane. The said reactions are preferably carried out at a temperature between 0 and 100° C., most preferably between 15 and 90° C. It is generally preferred to use an excess, for example, 10–50% over the stoichiometric amount, of compounds V or VI.

The base which should be present if compound IV is reacted with compound V may be, for example, an alkali metal carbonate, an alkaline earth metal carbonate such as calcium carbonate or barium carbonate, sodium hydroxide, potassium hydroxide, calcium hydroxide, magnesium hydroxide, or a nitrogenous base such as ammonia, pyridine, lutidine or triethylamine.

The desired product can be isolated from the reaction mixture in any conventional manner, for example, by filtering off the metal halide formed, distilling off the solvent, dissolving the residue obtained in a water-immiscible solvent such as chloroform, washing the solution obtained with water, an aqueous sodium bicarbonate solution, and again with water, drying the solution, distilling off the solvent, and purifying the residue obtained by crystallization.

Alternatively, compounds of the invention wherein X represents an oxygen atom can be prepared by a process comprising:

(a) reacting a compound II having the formula

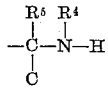

with a compound (compound VII) having the formula

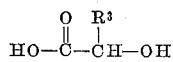

to form a compound (compound VIII) having the formula

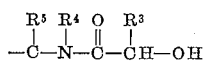

and (b) reacting compound VIII with a compound (compound IX) having the formula

in the presence of a base.

The reaction of compound II with compound VII mentioned under (a) is preferably carried out by refluxing equimolar amounts of the said reactants in an inert solvent which forms an azeotrope with water, for example, benzene, toluene or xylene, with continuous removal of the water formed as a result of the reaction by means of azeotropic distillation. The reaction is preferably carried out at a temperature between 80° and 200° C. The reaction mixture may be worked up in any conventional manner, for instance, by distilling off the solvent and purifying the residue obtained by means of vacuum distillation or crystallization.

The reaction of compound VIII with compound IX mentioned under (b) is carried out in the presence of a base. Suitable bases are those specified above; alkali metal carbonates and pyridine being preferred. The reaction is preferably carried out in an inert solvent, for instance a solvent as mentioned above; methyl ethyl ketone, methyl isobutyl ketone, cyclohexanone and acetone being particularly preferred. The reaction of compound VIII with compound IX is preferably carried out at a temperature between 10° and 70° C.

The novel compounds of the invention are excellent insecticides, particularly effective as acaricides and aphicides. These characteristics include not only high persistency, high toxicity to aphids and mites combined with a relatively low mammalian toxicity, but in addition the ability to penetrate tissues of plants readily when applied thereto and to be translocated in the plant so that the whole plant becomes protected against insect attack. Thus the compounds have systemic insecticidal activity.

According to another feature of the invention, the novel compounds of this invention may be formulated as insecticidal compositions comprising one or more of said compounds and a carrier, a surface active agent, or both a carrier and a surface active agent. The carrier may be a solid or liquid and may be of natural or synthetic origin. The carrier may be a fertilizer. The surface active agent may be a wetting, emulsifying or dispersing agent.

The term "carrier" as used herein means a material, which may be inorganic or organic and synthetic or of natural origin, with which the active substance is mixed or formulated to facilitate its storage, transport and handling, or its application to the plant, seed, soil or other object to be treated. The carrier may be a solid, a liquid or a compressed gas.

The carrier material may be any of the carrier materials usually applied in formulating pesticides. Examples of suitable solid carrier materials are talc, gypsum, diatomite, silicates, pyrophylite, clays of the montmorillonite and kaolinite groups, lime, wood flour, sulfur, carbon, resins such as, for example, polyvinyl chloride and polymers and copolymers of styrene, waxes, and solid fertilizers. Examples of suitable liquid carrier materials are water, the conventional horticultural petroleum spray oils, aromatic hydrocarbons such as, for example, benzene, toluene, xylene, ethylbenzene, cumene, and isodurene, coal tar fractions, straight-run petroleum distillates, thermally or catalytically cracked hydrocarbon oils, platformates, refined gas oil, light lubricating oil fractions, refined kerosine, animal and vegetable oils, and organic solvents such as, for example, methanol, ethanol, isopropanol, n-butanol, amyl alcohol, acetone, methyl ethyl ketone, methyl isobutyl ketone, glycols, glycol ethers, polyalkylene glycol ethers and esters, and chlorinated hydrocarbons.

The surface active agent may be any of the surface active agents usually applied in formulating pesticides. Examples of suitable surface active agents are alkylaryl sulfonates, alkyl sulfates containing at least 10 carbon atoms in the molecule, alkylaryl polyoxyethylene glycol ethers, sorbitan esters of fatty acids containing at least 10 carbon atoms in the molecule, alkylamide sulfonates, and condensation products of ethylene oxide with fatty acid esters, for example the oleic acid ester of anhydrosorbitol. Although both anion- and cation-active surface active agents may be used, the non-ionic surface active agents are preferred.

The compositions of the invention may be concentrates, suitable for storage or transport and containing, for example, from 10 to 95% by weight of a compound of the invention or may be dilute compositions containing, for instance, 0.00001 to 2% or even up to 10% by weight of active compound based on the total weight of the composition.

The compositions of the invention may be formulated as dusts comprising an intimate mixture of a compound of the invention and a finely powdered solid carrier, as wettable powders comprising a compound of the invention mixed with a dispersing agent and, if desired, a finely divided solid carrier, or as emulsifiable concentrates which are concentrated solutions or dispersions of a compound of the invention in an organic liquid, preferably a water-insoluble organic liquid, for example a petroleum hydrocarbon fraction, preferably containing an added emulsifying agent. Aqueous emulsions or dispersions containing an organophosphorus compound as specified above are also within the scope of the invention.

The compositions of the invention may contain in addition to the pesticidal organophosphorus compounds specified above other ingredients, for example, stickers, wetting agents, synergists, stabilizers, or biologically active substances such as other insecticides, fungicides or herbicides. Thus, insecticides such as, for example, 1,1,1-trichloro-2,2-bis(p-chlorophenyl)ethane; endrin; dieldrin; aldrin; O,O-dimethyl-O-(2,2-dichlorovinyl)phosphate; O,O - dimethyl - O - (1,2 - dibromo - 2,2 - dichloroethyl)phosphate; O,O - dimethyl - O - [1 - methyl - 2(1-phenylcarbethoxy) - vinyl] phosphate; O,O - dimethyl-O - 2[2 - N,N - dimethylcarbamoyl - 1 - methylvinyl]-phosphate; rotenone and pyrethrum may be incorporated in the compositions of the invention.

The present invention also relates to a method of combating insects which comprises bringing the insects into contact with one or more of the compounds or compositions specified above. Furthermore, the invention relates to a process for improving crop yields which comprises applying one or more of the compounds or compositions specified above to a crop area before or after crop planting, or before or after crop emergence.

The following examples illustrate preparation of typical species of the compounds of the invention. In these examples, "parts" means parts by weight unless otherwise indicated, with parts by weight bearing the same relationship to parts by volume as does the kilogram to the liter. (For brevity and convenience of later reference, each of the compounds is given a number.)

EXAMPLE I (a) *Preparation of 3-(N-chloroacetyl-N-methylamino)-tetrahydrothiophene-1,1-dioxide*

A mixture of 185 parts of 3-(N-methylamino)tetrahydrothiophene-1,1-dioxide hydrochloride and 169.5 parts of chloroacetyl chloride was heated at 100° C. until no more HCl gas was evolved. The excess of chloroacetyl chloride was then removed by distillation under reduced pressure, and the residue obtained washed with water and dried. Yield 205 parts (91%); melting point 80–82° C. A sample recrystallized from benzene melted at 85–86° C.

*Analysis* (percent by weight).—Found: C, 37.1; H, 5.5; S, 14.3. Calculated for $C_7H_{12}NO_3SCl$: C, 37.3; H, 5.3; S, 14.2.

(b) *Preparation of 3-[N-(dimethoxyphosphinothioylthio) - acetyl - N - methylamino]tetrahydrothiophene-1,1-dioxide (compound 1)*

A mixture of 11.3 parts of 3-(N-chloroacetyl-N-methylamino)-tetrahydrothiophene-1,1-dioxide and 9.9 parts of sodium dimethyl dithiophosphate in 200 parts by volume of acetone was refluxed for 30 minutes. After filtering off the sodium chloride formed, the acetone was distilled off and the residue taken up in 200 parts by volume of chloroform. The solution obtained was washed with water, a 5% aqueous sodium bicarbonate solution, and again with water and dried. After evaporating off the chloroform, 18.6 parts of a crystalline product remained. Melting point after recrystallization from benzene cyclohexane 83–85° C. Yield 85% w.

*Analysis* (percent by weight).—Found: C, 31.5; H, 5.5; N, 4.1; S, 27.4; P, 8.7. Calculated for $C_9H_{18}NO_5PS$: C, 31.1; H, 5.2; N, 4.0; S, 27.6; P, 8.9.

EXAMPLE II

*Preparation of 3 - [N - (diethoxyphosphinothioylthio)-acetyl - N - methylamine]tetrahydrothiophene - 1,1-dioxide (compound 2)*

This compound was prepared by the same method as described in Example Ib using equivalent amounts of sodium diethyl dithiophosphate and 3-(N-chloroacetyl-N-methylamino)tetradrothiophene - 1,1 - dioxide. Yield 79%, melting point 83–84.5° C.

*Analysis* (percent by weight).—Found: C, 35.8; H, 6.1; N, 3.7; P, 8.5. Calculated for $C_{11}H_{22}NO_5PS_3$: C, 35.2; H, 5.8; N, 3.7; P, 8.2.

EXAMPLE III (a) *Preparation of 3-(chloroacetylamino)tetrahydrothiophene-1,1-dioxide*

This compound was prepared by the same method as described in Example Ia using an equivalent amount of 3 - aminotetrahydrothiophene - 1,1 - dioxide. Melting point 90–92° C., yield 92%.

*Analysis* (percent by weight).—Found: C, 34.8; H, 5.0; N, 6.6; S, 14.5. Calculated for $C_6H_{10}NO_3SCl$: C, 34.1; H, 5.0; N, 6.6; S, 15.1.

(b) *Preparation of 3-[(dimethoxyphosphinothoylthio)-acetylamino]tetrahydrothiophene - 1,1 - dioxide (compound 3)*

A mixture of 9.9 parts of sodium dimethyl dithiophosphate and 10.6 parts of 3-(chloroacetylamino)tetrahydrothiophene-1,1-dioxide was refluxed in 200 parts by volume of acetone for 30 minutes. The solvent was then distilled off and the residue obtained extracted with benzene. The extract was washed with water, an aqueous sodium bicarbonate solution, and again with water, and dried. The solvent was distilled off and the residue kept at 60° C. and a pressure of 1 Torr. for 1 hour. The product obtained was a thick oil. Yield 61%.

*Analysis* (percent by weight).—Found: C, 28.4; H, 5.2; N, 4.2; S, 29.0. Calculated for $C_8H_{16}NO_5PS_3$: C, 28.8; H, 4.8; N, 4.2; S, 28.8.

EXAMPLE IV

*Preparation of 3-[(diethoxyphosphinothioylthio)acetylamine]tetrahydrothiophene-1,1-dioxide (compound 4)*

This compound was prepared from 3-(chloroacetylamine)tetrahydrothiophene-1,1-dioxide by the same method as described in Example IIIb using an equivalent amount of sodium diethyl dithiophosphate. The product was an oil. Yield 77%.

*Analysis* (percent by weight).—Found: C, 33.1; H, 5.7; N, 3.7; P, 8.1. Calculated for $C_{10}H_{20}NO_5PS_3$: C, 33.2; H, 5.5; N, 3.0; P, 8.6.

EXAMPLE V (a) *Preparation of 3-(N-allylamino)tetrahydrothiophene-1,1-dioxide hydrochloride*

29.5 parts of 2,5-dihydrothiophene-1,1-dioxide and 57 parts of allylamino were dissolved in 70 parts by volume of water containing 1 part of KOH. The mixture was kept at 70° C. for 48 hours. Water and excess of amine were then distilled off under vacuum, and the residue taken up in chloroform. Hydrogen chloride was then introduced into the solution obtained until no more precipitate was formed. The precipitated product was filtered off and recrystallized from ethanol. Yield 37 parts (70%).

*Analysis* (percent by weight).—Found: C, 39.4; H, 6.8; N, 6.8. Calculated for $C_7H_{14}NO_2SCl$: C, 39.7; H, 6.6; N, 6.6.

(b) *Preparation of 3 - [N - (dimethoxyphosphinothioylthio)acetyl - N - allylamine]tetrahydrothiophene - 1,1-dioxide (compound 5)*

3 - (N - allylamino)tetrahydrothiophene - 1,1 - dioxide hydrochloride was converted into 3-(N-chloroacetyl-N-allylamino)tetrahydrothiophene - 1,1 - dioxide using the method described in Example Ia. The oily product obtained in a yield of 86% was reacted with sodium dimethyl dithiophosphate by the same method as described in Example Ib. The product obtained was an oil; yield 72% based on the chloroacetyl compound.

*Analysis* (percent by weight).—C, 35.0; H, 5.3; N, 3.2; S, 25.4; P, 8.6. Calculated for $C_{11}H_{20}NO_5PS_3$: C, 35.4; H, 5.4; N, 3.8; S, 25.7; P, 8.3.

EXAMPLE VI (a) *Preparation of 3-(N-butylamino)tetrahydrothiophene-1,1-dioxide*

This compound was prepared by the same method as described in Example Va. The residue obtained by distilling off water and excess of amine was distilled under reduced pressure yielding the desired product in a yield of 55%. Boiling point 135° C. at 0.5 Torr.

*Analysis* (percent by weight).—Found: C, 50.2; H, 8.5; N, 7.0; S, 17.3. Calculated for $C_8H_{17}NO_2S$: C, 50.2; H, 8.8; N, 7.3; S, 16.8.

(b) *Preparation of 3-(N-chloroacetyl-N-n-butylamino)tetrahydrothiophene-1,1-dioxide*

To a solution of 24.6 parts of 3-(N-butylamino)tetrahydrothiophene-1,1-dioxide in 200 parts by volume of methylene chloride was added 13 parts of triethylamine. At a temperature of −10° C. a solution of 14.7 parts of chloroacetylchloride in 50 parts by volume of methylene chloride was added over a period of ½ hour. After the addition was completed the mixture was left at room temperature for 18 hours and then washed with dilute hydrochloric acid and water. By distilling off the solvent, 32 parts of an oily product was obtained (yield 93%).

(c) *Preparation of 3-[N-(dimethoxyphosphinothioylthio) acetyl-N-n-butylamine]tetrahydrothiophene-1,1-dioxide (compound 6)*

This compound was prepared by the same method as described in Example Ib. The product obtained was an oil. Yield 68%.

*Analysis* (percent by weight).—Found: C, 37.4; H, 6.0; N, 3.4; S, 23.0; P, 7.4. Calculated for $C_{12}H_{24}NO_5PS_3$: C, 37.0; H, 6.1; N, 3.6; S, 24.7; P, 7.9.

EXAMPLE VII

*Preparation of 3-[N-(diethoxyphosphinothioylthio)acetyl-N-n-butylamino]tetrahydrothiophene-1,1-dioxide (compound 7)*

This compound was prepared from the chloracetyl compound described in Example VIb by the same method as described in Example II. The product obtained was an oil; yield 84%.

*Analysis* (percent by weight).—Found: C, 40.0; H, 6.7; N, 3.2; P, 7.0. Calculated for $C_{14}H_{28}NO_5PS_3$: C, 40.3; H, 6.6; N, 3.3; P, 7.4.

EXAMPLE VIII (a) *Preparation of 3-(N-tert.butylamino)tetrahydrothiophene-1,1-dioxide*

This compound was prepared by the same method as described in Example VIa. Melting point 71–72° C.; yield 33%.

*Analysis* (percent by weight).—Found: C, 50.6; H, 9.0; N, 7.6; S, 16.7. Calculated for $C_8H_{17}NO_2S$: C, 50.2; H, 8.8; N, 7.3; S, 16.8.

(b) *Preparation of 3-(N-chloroacetyl-N-tert.butylamino)tetrahydrothiophene-1,1-dioxide*

This compound was prepared by the same method as described in Example VIb. Melting point 83–85° C.; yield 60%.

*Analysis* (percent by weight).—Found: C, 44.4; H, 6.7; N, 5.3; S, 12.2. Calculated for $C_{10}H_{18}NO_3SCl$: C, 44.8; H, 6.7; N, 5.2; S, 12.0.

(c) *Preparation of 3-[N-(dimethoxyphosphinothioylthio) acetyl-N-tert.butylamino]tetrahydrothiophene - 1,1-dioxide (compound 8)*

This compound was prepared by the same method as described in Example Ib. The crude product was recrystallized from benzene. Melting point 138–139° C.; yield 72.5%.

*Analysis* (percent by weight).—Found: C, 37.4; H, 6.1; N, 3.5; P, 7.9. Calculated for $C_{12}H_{24}NO_5PS_3$: C, 37.0; H, 6.1; N, 3.6; P, 7.9.

EXAMPLE IX

*Preparation of 3-[N-(diethoxyphosphinothioylthio)acetyl-N - tert.butylamino]tetrahydrothiophene - 1,1 - dioxide (compound 9)*

This compound was prepared from 3-(N-chloroacetyl-N-tert.butylamino)tetrahydrothiophene-1,1-dioxide by the same method as described in Example II. The crude product was recrystallized from isopropanol. Melting point 95° C.; yield 80%.

*Analysis* (percent by weight).—Found: C, 40.6; H. 6.5; N, 3.2; S, 23.0. Calculated for $C_{14}H_{28}NO_5PS_3$: C, 40.3; H, 6.7; N, 3.4; S, 23.0.

EXAMPLE X (a) *Preparation of 3-(N-cyclohexylamino)tetrahydrothiophene-1,1-dioxide*

This compound was prepared by the same method as described in Example VIa. The product was an oil; yield 20%.

*Analysis* (percent by weight).—Found: C, 54.7; H, 8.9; N, 7.0; S, 14.6. Calculated for $C_{10}H_{19}NO_2S$: C, 55.4; H, 8.7; N, 6.5; S, 14.8.

(b) *Preparation of 3-(N-chloroacetyl-N-cyclohexylamino)tetrahydrothiophene-1,1-dioxide*

This compound was prepared by the same method as described in Example VIb. Melting point 153° C.; yield 76%.

*Analysis* (percent by weight).—Found: C, 49.6; H, 6.9; N, 4.6; S, 10.9. Calculated for $C_{12}H_{21}NO_3SCl$: C, 49.2; H, 6.8; N, 4.8; S, 10.9.

(c) *Preparation of 3-[N-(dimethoxyphosphinothioylthio) acetyl-N-cyclohexylamino]tetrahydrothiophene - 1,1-dioxide (compound 10)*

This compound was prepared from 3-(N-chloroacetyl-N-cyclohexylamino)tetrahydrothiophene - 1,1-dioxide by the same method as described in Example Ib. The crude product was recrystallized from isopropanol. Melting point 94–95° C.; yield 70%.

*Analysis* (percent by weight).—Found: C, 39.7; H, 6.3; N, 3.4; S, 22.8; P, 7.1. Calculated for $C_{14}H_{26}NO_5PS_3$: C, 40.4; H, 6.3; N, 3.4; S, 23.1; P, 7.5.

EXAMPLE XI

*Preparation of 3-[N-(diethoxyphosphinothioylthio)acetyl-N - cyclohexylamino]tetrahydrothiophene - 1,1 - dioxide (compound 11)*

This compound was prepared from 3-(N-chloroacetyl-N-cyclohexylamino)tetrahydrothiophene - 1,1-dioxide by the same method as described in Example II. The crude product was purified by recrystallization from isopropanol. Melting point 74° C.; yield 40%.

*Analysis* (percent by weight).—Found: C, 44.3; H, 7.5; N, 3.2; S, 21.5; P, 6.6. Calculated for $C_{16}H_{30}NO_5PS_3$: C, 43.3; H, 6.8; N, 3.1; S, 21.6; P, 7.0.

EXAMPLE XII (a) *Preparation of 3-(N-benzylamino)tetrahydrothiophene-1,1-dioxide hydrochloride*

This compound was prepared by the same method as described in Example Va using benzylamine. Melting point 252–254° C.; yield 60%.

*Analysis* (percent by weight).—Found: C, 50.4; H, 6.2; N, 5.4; S, 12.4. Calculated for $C_{11}H_{16}NO_2SCl$: C, 50.6; H, 6.1; N, 5.3; S, 12.2.

(b) *Preparation of 3-[N-(dimethoxyphosphinothioylthio) acetyl-N-benzylamine]tetrahydrothiophene - 1,1-dioxide (compound 12)*

This compound was prepared via the appropriate N-chloroacetyl compound, which was obtained in a yield of 91%, by the same method as described in Example Vb. The product obtained was an oil; the yield based on the chloroacetyl compound 88%.

*Analysis* (percent by weight).—C, 42.1; H, 5.3; S, 23.3; P, 7.1. Calculated for $C_{15}H_{22}NO_5PS_3$: C, 42.5; H, 5.2; S, 22.6; P, 7.3.

EXAMPLE XIII (a) *Preparation of 3-(N-alpha-bromopropionyl-N-methylamino)-tetrahydrothiophene-1,1-dioxide*

This compound was prepared by the same method as described in Example Ia using alpha-bromopropionyl chloride. Melting point 94–95° C.; yield 83%.

*Analysis* (percent by weight).—Found: N, 5.0; S, 12.4. Calculated for $C_8H_{14}NO_3SBr$: N, 4.9; S, 11.2.

(b) *Preparation of [N-alpha-(dimethoxyphosphinothioyl-thio)-propionyl - N-methylamino]tetrahydrothiophene-1,1-dioxide (compound 13)*

This compound was prepared by the same method as described in Example Ib. Melting point 96–98° C.; yield 51%.

*Analysis (percent by weight).*—Found: C, 33.2; H, 5.6; N, 3.7; S, 26.5; P, 8.4. Calculated for $C_{10}H_{20}NO_5PS_3$: C, 33.1; H, 5.5; N, 3.8; S, 26.5; P, 8.5.

EXAMPLE XIV (a) *Preparation of 3'-(N-methylamino)-3-methyltetra-hydrothiophene-1,1-dioxide hydrochloride*

This compound was prepared by the same method as described in Example Va using 2,5-dihydro-3-methylthio-phene-1,1-dioxide and methylamine. Yield 10%.

*Analysis (percent by weight).*—Found: C, 36.2; H, 6.9; N, 6.6; S, 16.2. Calculated for $C_6H_{14}NO_2SCl$: C, 36.0; H, 7.0; N, 7.0; S, 16.1.

(b) *Preparation of 3-(N-chloroacetyl-N-methylamino)-3-methyltetrahydrothiophene-1,1-dioxide*

This compound was prepared by the same method as described in Example Ia. Melting point 105–107° C.; yield 73.5%.

*Analysis (percent by weight).*—Found: C, 40.1; H, 5.9; N, 5.8; S, 13.4. Calculated for $C_8H_{14}NO_3SCl$: C, 40.1; H, 58.8; N, 5.8; S, 13.3.

(c) *Preparation of 3-[N-(dimethoxyphosphinothioylthio)-acetyl-N-methylamino] - 3-methyltetrahydrothiophene-1,1-dioxide (compound 14)*

This compound was prepared by the same method as described in Example Ib. Melting point 82–83° C.; yield 73%.

*Analysis (percent by weight).*—Found: C, 33.0; H, 5.6; N, 3.7; S, 26.1; P, 8.9. Calculated for $C_{10}H_{20}NO_5PS_3$: C, 33.2; H, 5.5; N, 3.8; S, 26.6; P, 8.5.

EXAMPLE XV

*Preparation of 3-[N-(diethoxyphosphinothioylthio)acetyl-N-methylamino] - 3 - methyltetrahydrothiophene - 1,1-oxide (compound 15)*

This compound was prepared by the same method as described in Example Ib using sodium diethyl dithiophosphate. Melting point 65–67° C.; yield 78% based on the chloroacetyl compound.

*Analysis (percent by weight).*—Found: C, 37.3; H, 6.2; N, 3.6; P, 8.4. Calculated for $C_{12}H_{24}NO_5PS_3$: C, 37.1; H, 6.1; N, 3.6; P, 8.0.

EXAMPLE XVI (a) *Preparation of 3-(N-methylamino)-5-methyl-tetrahydrothiophene-1,1-dioxide hydrochloride*

This compound was prepared by the same method as described in Example Va using 2-methyl-2,5-dihydro-thiophene-1,1-dioxide and methyl amine. Yield 82%.

*Analysis (percent by weight).*—Found: N, 6.9; S, 15.5. Calculated for $C_6H_{14}NO_2SCl$: N, 7.0; S, 16.1.

(b) *Preparation of 3-(N-chloroacetyl-N-methylamino)-5-methyltetrahydrothiophene-1,1-dioxide*

This compound was prepared by the same method as described in Example Ia. Melting point 88.5–90° C.; yield 93%.

*Analysis (percent by weight).*—Found: C, 39.7; H, 5.9; N, 5.7; S, 13.2. Calculated for $C_8H_{14}NO_3SCl$: C, 40.1; H, 5.8; N, 5.8; S, 13.3.

(c) *Preparation of 3-[N-(dimethoxyphosphinothionyl-thio)-acetyl-N-methylamino] - 5-methyltetrahydrothio-phene-1,1-dioxide (compound 16)*

This compound was prepared by the same method as described in Example Ib. Melting point 75–76° C.; yield 82.5%.

*Analysis (percent by weight).*—Found: C, 33.3; H, 5.4; N, 3.8; S, 26.4; P, 8.9. Calculated for $C_9H_{20}NO_5PS_3$: C, 33.1; H, 5.5; N, 3.8; S, 26.5; P, 8.5.

EXAMPLE XVII

*Preparation of 3-[N-(dimethylphosphinothioylthio)acetyl-N-methylamino]tetrahydrothiophene-1,1-dioxide (compound 17)*

5.64 parts of 3-(N-chloroacetyl-N-methylamino)-tetrahydrothiophene-1,1-dioxide and 5 parts of potassium dimethyl dithiophosphinate monohydrate were heated under reflux in 50 parts by volume of acetone for 30 minutes. After removal of the potassium chloride formed and the acetone, an oil remained, which was taken up in chloroform and washed with a 5% aqueous sodium bicarbonate solution and water. The dried solution left on evaporation of the solvent 8.85 parts of a solid residue. Melting point 104–105° C. after recrystalliaztion from methyl isobutyl ketone; yield 90%.

*Analysis (percent by weight).*—Found: C, 34.5; H, 5.6; N, 4.5; P, 9.7. Calculated for $C_9H_{18}NO_3PS_3$: C. 34.2; H, 5.7; N, 4.4; P, 9.8.

EXAMPLE XVIII

*Preparation of 3-(N-lactyl-N-methylamino)tetra-hydrothiophene-1,1-dioxide*

A mixture of 37 parts of 3-N-methylaminotetrahydro-thiophene-1,1-dioxide, 22.5 parts of lactic acid and 50 parts by volume of xylene was refluxed for 5 hours with continuous removal of water. At the end of that time the temperature of the reaction mixture was 155° C. The mixture was then distilled in vacuum, yielding 21.4 parts of an oil boiling between 220 and 222° C. at 0.8 Torr.

*Analysis (percent by weight).*—Found: C, 43.4; H, 7.0; N, 6.1; S, 14.5. Calculated for $C_8H_{15}NSO_4$: C, 43.5; H, 6.7; N, 6.3; S, 14.5.

(b) *Preparation of 3 - [N - alpha - (dimethoxyphosphino-thioyloxy)propionyl - N - methylamino]tetrahydrothio-phene-1,1-dioxide (compound 18)*

15.7 parts of 3-(N-lactyl-N-methylamino)tetrahydro-thiophene-1,1-dioxide were dissolved in 75 parts by volume of dry methyl isobutylketone. To this solution were added 10.8 parts of dry powdered potassium carbonate and 11.4 parts of dimethyl thionophosphoro-chloridate. The mixture was stirred at 40° C. for 6½ hours. The residue left after filtration of the solids and evaporation of the solvent was taken up in chloroform and the solution obtained washed with sodium bicarbonate solution and water until neutral. The solvent was distilled off, leaving 9.2 parts of an oil which was purified by chromatography over silica gel. Yield 37.6%.

*Analysis (percent by weight).*—Found: C, 34.2; H, 6.0; N, 4.0; P, 8.7. Calculated for $C_{10}H_{20}NO_6PS_2$: C, 34.8; H, 5.8; N, 4.0; P, 8.9.

EXAMPLE XIX

*Preparation of 3-[N-(dimethoxyphosphinothioyloxy)ace-tyl - N - methylamino]tetrahydrothiophene - 1,1 - dioxide (compound 19)*

This compound was prepared by the same method as described in Example Ib, using sodium dimethyl dithiophosphate. Melting point 87–89° C. after recrystallization from toluene; yield 54%.

*Analysis (percent by weight).*—Found: C, 33.3; H, 5.5; N, 4.5; S. 18.5; P, 9.0. Calculated for $C_9H_{18}NO_6PS_2$: C, 32.6; H, 5.4; N, 4.2; S, 19.3; P, 9.4.

EXAMPLE XX

The insecticidal activity of compounds of the invention was tested as follows:

I. The compounds were formulated as solutions or suspensions in water containing 20% by weight of acetone and 0.05% by weight of a wetting agent. The formulations contained 0.2% by weight of the compound to be tested. Broad bean plants, trimmed to one leaf each, were sprayed on the under surface of the leaf with the above formulation. Spraying was effected with a spraying machine delivering 40 gallons per acre, the plants passing under the spray on a moving belt. Ten apterous (6-day-old) pea aphids (*Acyrthosiphon pisum*) were placed on the sprayed leaves, and each plant was then enclosed in a glass cylinder fitted at one end with a muslin cap. Mortality counts were made after 24 hours.

II. In tests against glass house red spider mites (*Tetranychus telarius*), leaf discs cut from French bean plants were sprayed in the manner described under I. One hour after spraying, the discs were inoculated with 10 adult mites. Mortality counts were made 24 hours after inoculation.

The results of the above tests are summarized in the following Table I, where A denotes 100% kill and B partial kill of the test insects.

TABLE I

| Compound | Acyrthosiphon pisum | Tetranychus telarius |
|---|---|---|
| Compound 1 | A | A |
| Compound 2 | A | A |
| Compound 3 | A | A |
| Compound 4 | A | A |
| Compound 5 | A | B |
| Compound 6 | A | A |
| Compound 7 | A | A |
| Compound 8 | --- | A |
| Compound 9 | B | A |
| Compound 13 | A | B |
| Compound 14 | A | A |
| Compound 15 | A | A |
| Compound 16 | A | A |
| Compound 17 | A | A |
| Compound 18 | A | B |
| Compound 19 | A | A |

EXAMPLE XXI

The systemic activity of compounds of the invention was investigated as follows:

Formulations of the compound to be tested were made by dissolving the compound in acetone and diluting the solution obtained with water. In all formulations prepared the concentration of acetone was less than 2% by volume; the concentrations of the test compound varied from 1–100 p.p.m. The roots of broad bean plants were washed free of soil and dipped in 200 milliliters of the formulation for 24 hours. After the dip period, the roots were removed from the formulation, washed with water and transferred to fresh tap water in which they were kept for the remaining period of the test. The plants were then inoculated with pea aphids and mortality counts were made 24 hours after inoculation. In the following Table II the results are expressed in terms of the dosage range of the test compound in the formulation applied giving 50% mortality of the insects ($LC_{50}$).

TABLE II

| Compound: | $LC_{50}$ |
|---|---|
| 1 | p.p.m. 1–3 |
| 2 | p.p.m. 1–3 |
| 4 | p.p.m. 1–10 |

I claim as my invention:

1. Compounds having the general formula:

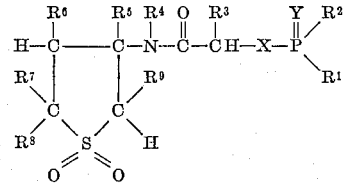

wherein each of $R^1$ and $R^2$ is a member of the group consisting of alkyl and alkoxy of from 1 to 4 carbon atoms, $R^3$ is a member of the group consisting of alkyl of from 1 to 4 carbon atoms, $R^4$ is a member of the group consisting of alkyl and alkenyl of up to 4 carbon atoms, cycloalkyl and aralkyl of up to 10 carbon atoms, each of $R^5$, $R^6$, $R^7$, $R^8$ and $R^9$ is a member of the group consisting of hydrogen and alkyl of from 1 to 4 carbon atoms, and X and Y each are members of the group consisting of oxygen and sulfur.

2. Compounds as defined in claim 1 wherein $R^1$ and $R^2$ are alkoxy of from one to two carbon atoms.

3. Compounds as defined in claim 2, wherein $R^4$ is methyl and $R^3$, $R^5$, $R^6$, $R^7$, $R^8$ and $R^9$ are hydrogen.

4. 3 - [(Dimethoxyphosphinothioylthio)acetylamino] tetrahydrothiophene-1,1-dioxide.

5. 3 - [(Diethoxyphosphinothioylthio)acetylamino]tetrahydrothiophene-1,1-dioxide.

6. 3 - [N - (Dimethoxyphosphinothioylthio)acetyl - N-methylamino]tetrahydrothiophene-1,1-dioxide.

7. 3 - [N - (Diethoxyphosphinothioylthio)acetyl - N-methylamino]tetrahydrothiophene-1,1-dioxide.

References Cited by the Examiner

UNITED STATES PATENTS 2,882,278   4/1959   McConnell et al. ___ 260—337.1

WALTER A. MODANCE, *Primary Examiner.*

JAMES A. PATTEN, *Assistant Examiner.*